US011332097B2

(12) United States Patent
Ito (10) Patent No.: US 11,332,097 B2
(45) Date of Patent: May 17, 2022

(54) PASSENGER SEAT AIRBAG (71) Applicant: TOYODA GOSEI CO., LTD., Kiyosu (JP)

(72) Inventor: Shun Ito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/002,249

(22) Filed: Aug. 25, 2020

(65) Prior Publication Data

US 2021/0061216 A1 Mar. 4, 2021

(30) Foreign Application Priority Data

Sep. 4, 2019 (JP) .............................. JP2019-161515

(51) Int. Cl.
B60R 21/2338 (2011.01)
B60R 21/205 (2011.01)
B60R 21/00 (2006.01)

(52) U.S. Cl.
CPC ........ B60R 21/2338 (2013.01); B60R 21/205 (2013.01); *B60R 2021/0004* (2013.01); *B60R 2021/23382* (2013.01)

(58) Field of Classification Search
CPC .............. B60R 21/2338; B60R 21/205; B60R 2021/23382
See application file for complete search history.

(56) References Cited

U.S. PATENT DOCUMENTS

| 8,151,722 | B2 * | 4/2012 | Kumagai | ............. B60R 21/235 |
| | | | | 112/475.08 |
| 8,371,612 | B2 * | 2/2013 | Williams | ........... B60R 21/2338 |
| | | | | 280/743.2 |
| 8,864,170 | B2 * | 10/2014 | Yamada | .............. B60R 21/2338 |
| | | | | 280/743.2 |
| 9,278,660 | B2 * | 3/2016 | Yamada | ................. B60R 21/231 |
| 9,701,271 | B2 * | 7/2017 | Miura | ................... B60R 21/215 |
| 10,427,639 | B2 * | 10/2019 | Williams | ............. B60R 21/239 |
| 2018/0154857 | A1 | 6/2018 | Yamada | |
| 2020/0079313 | A1 * | 3/2020 | Hiraiwa | ................ B60R 21/235 |

FOREIGN PATENT DOCUMENTS

| JP | 2017-178222 A | 10/2017 |
| JP | 2018-94933 A | 6/2018 |

* cited by examiner

*Primary Examiner* — Jonathan Ng
*Assistant Examiner* — Joselynn Y Sliteris
(74) *Attorney, Agent, or Firm* — Posz Law Group, PLC (57) ABSTRACT

A passenger seat airbag includes: a bag main body; and a left-right tether, arranged in the bag main body to connect a left wall portion and a tight wall portion facing each other on a left-right direction side of the peripheral wall portion, preventing left and right outward protrusions of a connecting portion with the left wall portion or the right wall portion. The connecting portion includes a pair of strip portions and an intermediate portion which is sewn and connected to the left wall portion or the right wall portion between the strip portions. A sewn portion for sewing the intermediate portion to the left wall portion or the right wall portion is configured as a substantially rectangular shape having a pair of strip-side sides on the strip portion side and a pair of non-strip-side sides connecting both ends of the pair of strip-side sides.

3 Claims, 10 Drawing Sheets

A-A CROSS SECTION

B-B CROSS SECTION

FIG.8

C-C CROSS SECTION

PASSENGER SEAT AIRBAG

CROSS-REFERENCE TO RELATED APPLICATION(S)

This application is based upon and claims the benefit of priority from prior Japanese patent application No. 2019-161515 filed on Sep. 4, 2019, the entire contents of which are incorporated herein by reference.

BACKGROUND

1. Field of the Invention

The present invention relates to a passenger seat airbag which is folded and accommodated in an accommodation portion provided in an instrument panel located in front of an occupant seated in a passenger seat, makes inflation gas flow inside, and expands and inflates toward a rear side of a vehicle while inflating.

2. Description of the Related Art

In a related art, as a passenger seat airbag, in order to prevent interference with a monitor or the like of a car navigation system partially protruding from an instrument panel, in some cases, when inflation is completed, one of a left wall portion and a right wall portion facing each other in a left-right direction is recessed (see, for example, JP-A 2018-94933). In the passenger seat airbag, by arranging a left-right tether inside a bag main body to connect the left wall portion and the right wall portion, it is configured so that the left wall portion side is recessed. In detail, the left-right tether consisting of a strip-shaped flexible sheet body is arranged so that a width direction extends along an up-down direction, and by arranging two parts so that a joint position of an end portion with the left wall portion is shifted in the front and back, a peripheral region of a joint portion with the left wall portion is widely recessed in the front and back to prevent interference with a monitor or the like.

However, in the passenger seat airbag of the related art, the two left-right tethers are shifted forward and backward so that end portions are respectively joined to the left wall portions. Therefore, there is room for improvement in that an area where the end portion of the left-right tether is joined could be recessed stably over a wide area when inflation is completed.

SUMMARY

The present invention is provided to solve the problem described above and an object of the invention is to provide a passenger seat airbag capable of stably recessing a predetermined portion over a wide area when inflation is completed.

According to an aspect of the invention, there is provided a passenger seat airbag, which is folded and accommodated in an accommodation portion provided in an instrument panel located in front of an occupant seated in a passenger seat, makes inflation gas flow inside, and expands and inflates toward a rear side of a vehicle while inflating, the passenger seat airbag including: a bag main body composed of a flexible sheet body, the bag main body including: an occupant side wall portion arranged on the occupant side when the inflation is completed; and a peripheral wall portion extending from a peripheral edge of the occupant side wall portion and converging toward a front end side attached to the accommodation portion side; and a left-right tether, arranged in the bag main body to connect a left wall portion and a right wall portion facing each other on a left-right direction side of the peripheral wall portion, the left-right tether preventing left and right outward protrusions of a connecting portion with the left wall portion or the right wall portion, where: the connecting portion of the left-right tether is composed of a tether main body of a strip-shaped sheet body having a flexibility and includes a pair of strip portions and an intermediate portion which is sewn and connected to the left wall portion or the right wall portion between the strip portions; and a sewn portion for sewing the intermediate portion to the left wall portion or the right wall portion is configured as a substantially rectangular shape having a pair of strip-side sides on the strip portion side and a pair of non-strip-side sides connecting both ends of the pair of strip-side sides.

In the passenger seat airbag of the invention, in the left-right tether, the connecting portion connected to at least one side of the left wall portion or the right wall portion has a configuration in which the intermediate portion consisting of a tether main body is sewn to the left wall portion or the right wall portion by a substantially rectangular sewn portion and a pair of strip portions extends from opposite sides of this sewn portion. Therefore, in the passenger seat airbag of the invention, when the inflation of the bag main body is completed, the tension acting on each strip portion acts to pull each strip-side side of the sewn portion inward. Since the sewn portion has a substantially rectangular shape, it is possible to apply the tension of the tether main body not only to sides on both strip-side sides of the tether main body but also to sides on both non-strip-side sides. Therefore, the entire arrangement area (entire rectangular area) of the sewn portion in the left wall portion or the right wall portion will be pulled to be pulled inward to the left and right. Therefore, in the passenger seat airbag of the invention, the left-right tether allows the left and right outward protrusions of the left wall portion or the right wall portion to be stably regulated in a wide area. Thus, it is possible to stably prevent interference with a monitor or the like which partially protrudes from the instrument panel.

Therefore, in the passenger seat airbag of the invention, it is possible to stably recess a predetermined portion in a wide area when the inflation is completed.

According to the passenger seat airbag according to the aspect of the invention, the tether main body may be arranged on the left wall portion side and the right wall portion side, and the left-right tether may be configured by connecting terminals of the pair of strip portions extending from each of the connecting portions.

When the passenger seat airbag has such a configuration, both the left wall portion side and the right wall portion side of the airbag can be stably restrained from protruding left and right outward in a wide area. Thus, it can be shared to prevent interference with a monitor or the like for right-hand drive vehicles and left-hand drive vehicles.

According to the passenger seat airbag according to the aspect of the invention, in the bag main body, a front-rear tether which connects a front end side at the time of completion of inflation and the occupant side wall portion substantially along a front-rear direction may be arranged above or below the left-right tether, and the tether main body may be arranged such that, when the inflation of the bag main body is completed, one of the strip portions on a side closer to the front-rear tether is aligned with a width direction substantially along the front-rear direction to approach an edge on an up-down direction side on a side closer to the left-right tether in the front-rear tether.

When the passenger seat airbag has the configuration described above, even when the left-right tether comes into contact with the front-rear tether during expansion and inflation, the tether main body of the left-right tether is in contact with the front-rear tether on the wide surface in the width direction of the strip portion on the approaching side. Therefore, with less catching, it can be smoothly slid with respect to the front-rear tether, and thus the bag main body can be quickly inflated.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
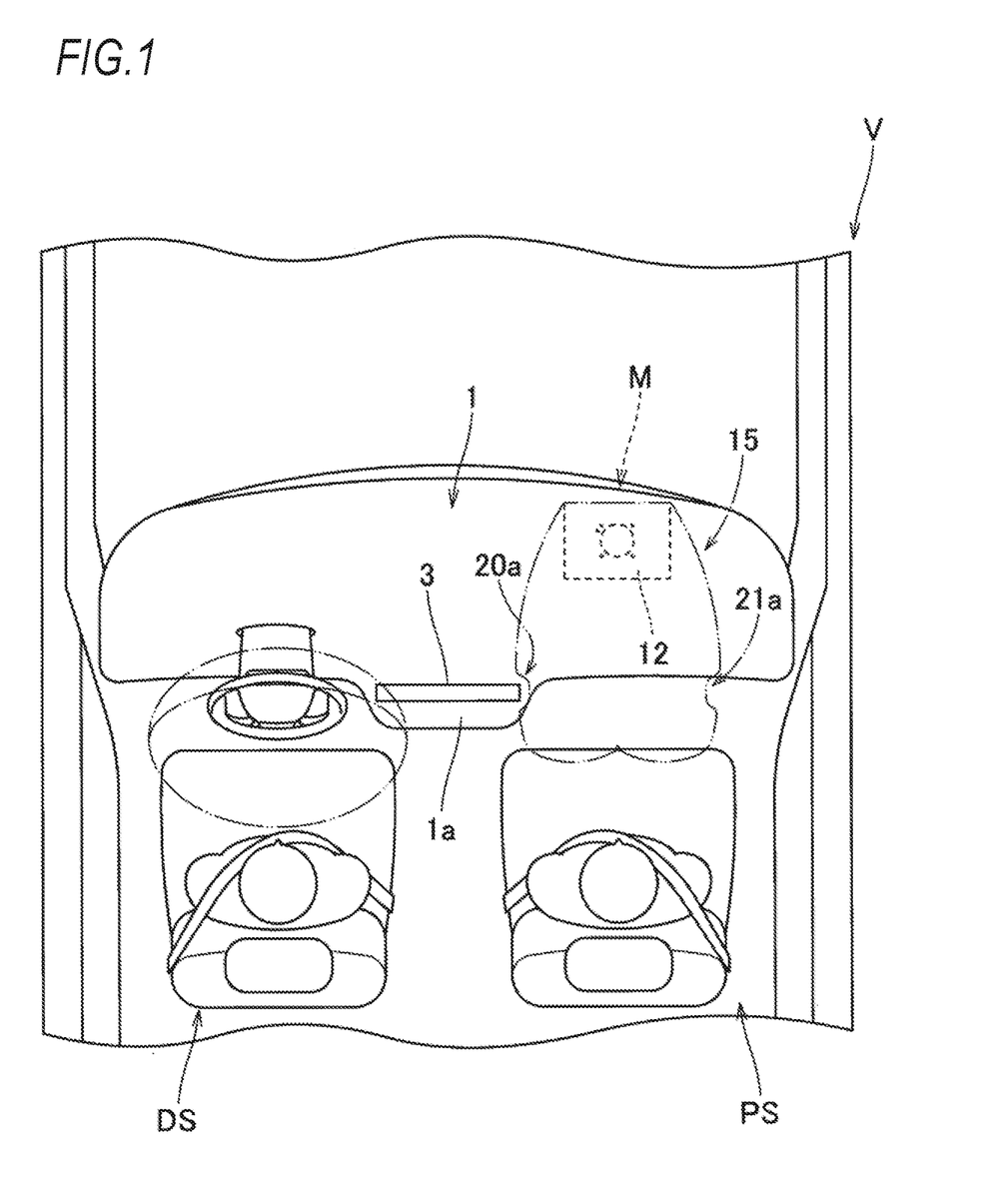
FIG. 1 is a schematic plan view illustrating a state in which a passenger seat airbag device using a passenger seat airbag according to an embodiment of the invention is mounted on a vehicle.
Figure 2:
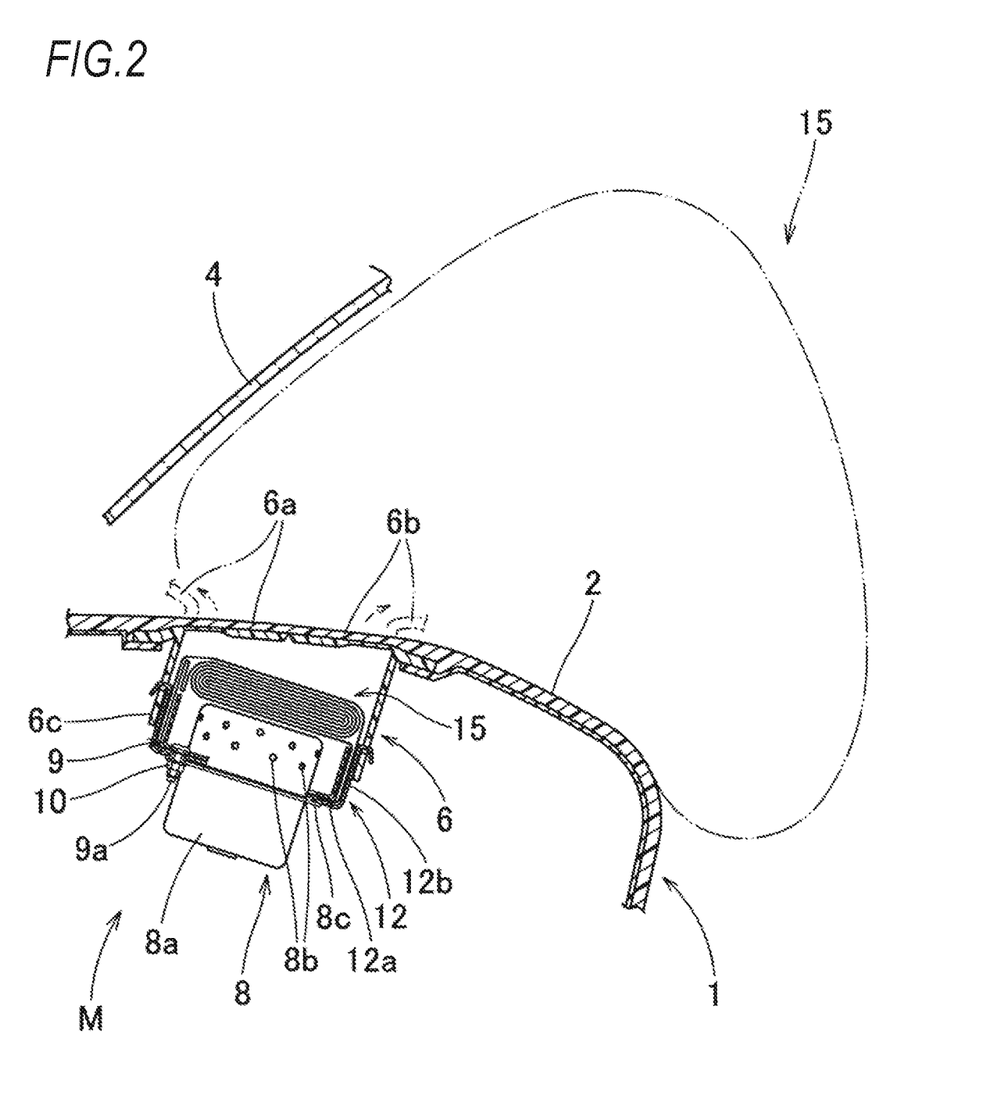
FIG. 2 is a schematic vertical cross-sectional view illustrating a state in which the passenger seat airbag device is mounted on the vehicle.
Figure 10:
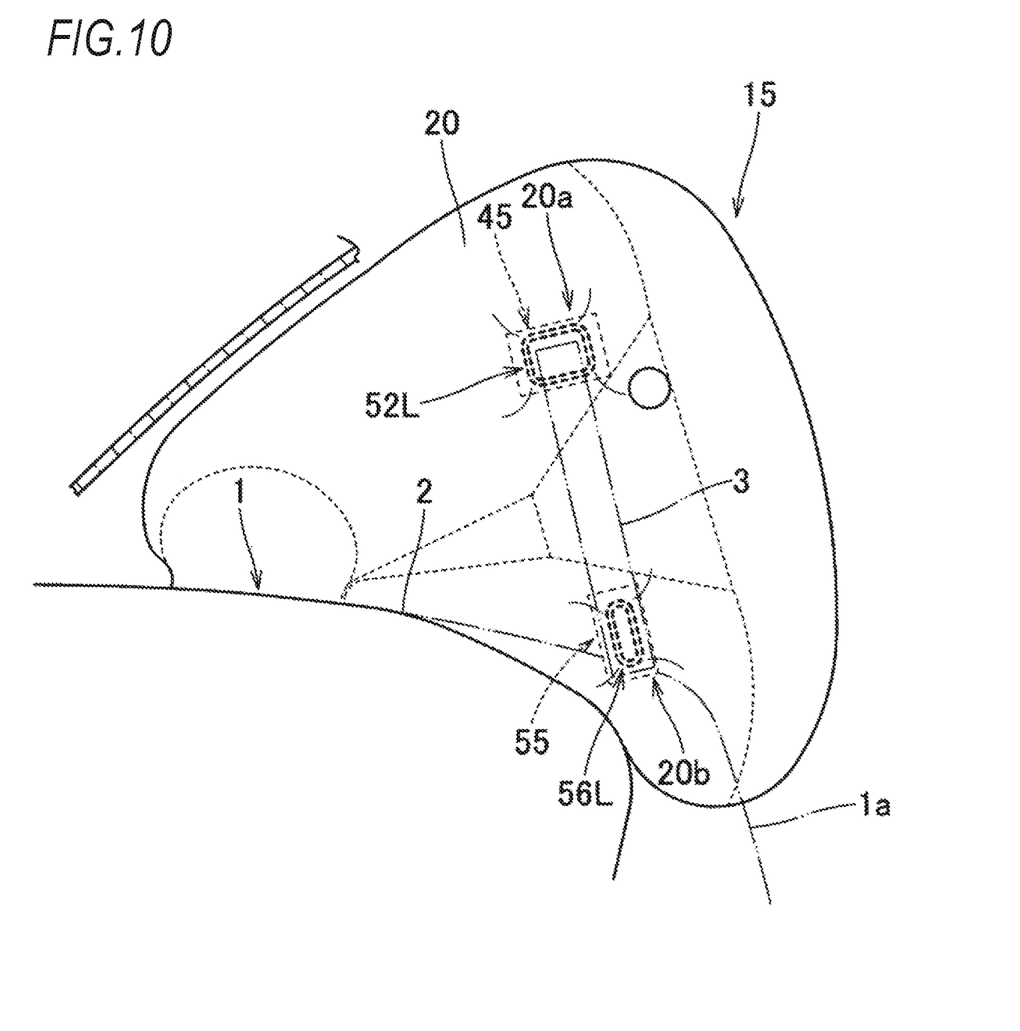
FIG. 10 is a schematic side view illustrating a state in which the airbag of the embodiment is inflated in a vehicle-mounted state.

An embodiment of the invention will be described below with reference to the drawings. As illustrated in FIGS. 1 and 2, a passenger seat airbag 15 (hereinafter abbreviated as "airbag") of the embodiment is used in a top-mount type passenger airbag device M arranged inside an upper surface 2 of an instrument panel 1 in front of an occupant seated in a passenger seat PS of a vehicle V. As illustrated in FIGS. 1 and 10, on the instrument panel 1 of the vehicle V on which the passenger airbag device M is mounted, on a center side in a vehicle width direction of the vehicle V in a vicinity of a rear end of a center side portion 1a which is a region in front of a portion between a driver seat DS and the passenger seat PS, a monitor 3 of a car navigation system is arranged to protrude upward from the upper surface 2. That is, in the instrument panel 1 of the embodiment, the monitor 3 is arranged to partially protrude in a central region in the vehicle width direction. In the embodiment, the front-rear, up-down, left-right directions correspond to the front-rear, up-down, left-right directions of the vehicle V unless otherwise specified.

As illustrated in FIG. 2, the passenger airbag device M of the embodiment is configured by including a folded airbag 15, an inflator 8 which supplies inflation gas to the airbag 15, a case 12 as an accommodation part for accommodating and holding the airbag 15 and the inflator 8, a retainer 9 for attaching the airbag 15 and the inflator 8 to the case 12, and an airbag cover 6 for covering the folded airbag 15.

The airbag cover 6 is formed integrally with the instrument panel 1 made of synthetic resin and is configured to push two front-rear door portions 6a and 6h by the airbag 15 to open when the airbag 15 is expanded and inflated. A connecting wall portion 6c connected to the case 12 is formed around the door portions Ga and 6b of the airbag cover 6.

As illustrated in FIG. 2, the inflator 8 is configured to include a substantially columnar main body portion 8a having a plurality of gas discharge ports 8b and a flange portion 8c for attaching the inflator 8 to the case 12.

The case 12 as an accommodation part is formed in a substantially rectangular parallelepiped shape made of sheet metal having a rectangular opening on an upper end side. As illustrated in FIG. 2, the case 12 is configured to include a substantially rectangular plate-shaped bottom wall portion 12a to which the inflator 8 is inserted and attached by being inserted from below and a peripheral wall portion 12b extending upward from an outer peripheral edge of the bottom wall portion 12a and locking the connecting wall portion 6c of the airbag cover 6. In the embodiment, by penetrating a periphery of an inflow opening 24 in the airbag 15, the bottom wall portion 12a of the case 12, and the flange portion 8c of the inflator 8 with each bolt 9a of the retainer 9 arranged in the airbag 15 as a mounting means and fixing a nut 10, the airbag 15 and the inflator 8 are attached to the bottom wall portion 12a of the case 12. A bracket (not illustrated) connected to a body side of the vehicle V is provided in the bottom wall portion 12a of the case 12.

As illustrated in FIGS. 3 to 6, the airbag 15 includes a bag main body 16 which is inflated by allowing an inflation gas to flow therein, a rectifying cloth 32 for restricting the flow of the inflation gas into the bag main body 16, and tethers 36, 45, and 55 which are arranged in the bag main body 16 and regulate the inflation completion shape of the bag body 16.

Figure 3:
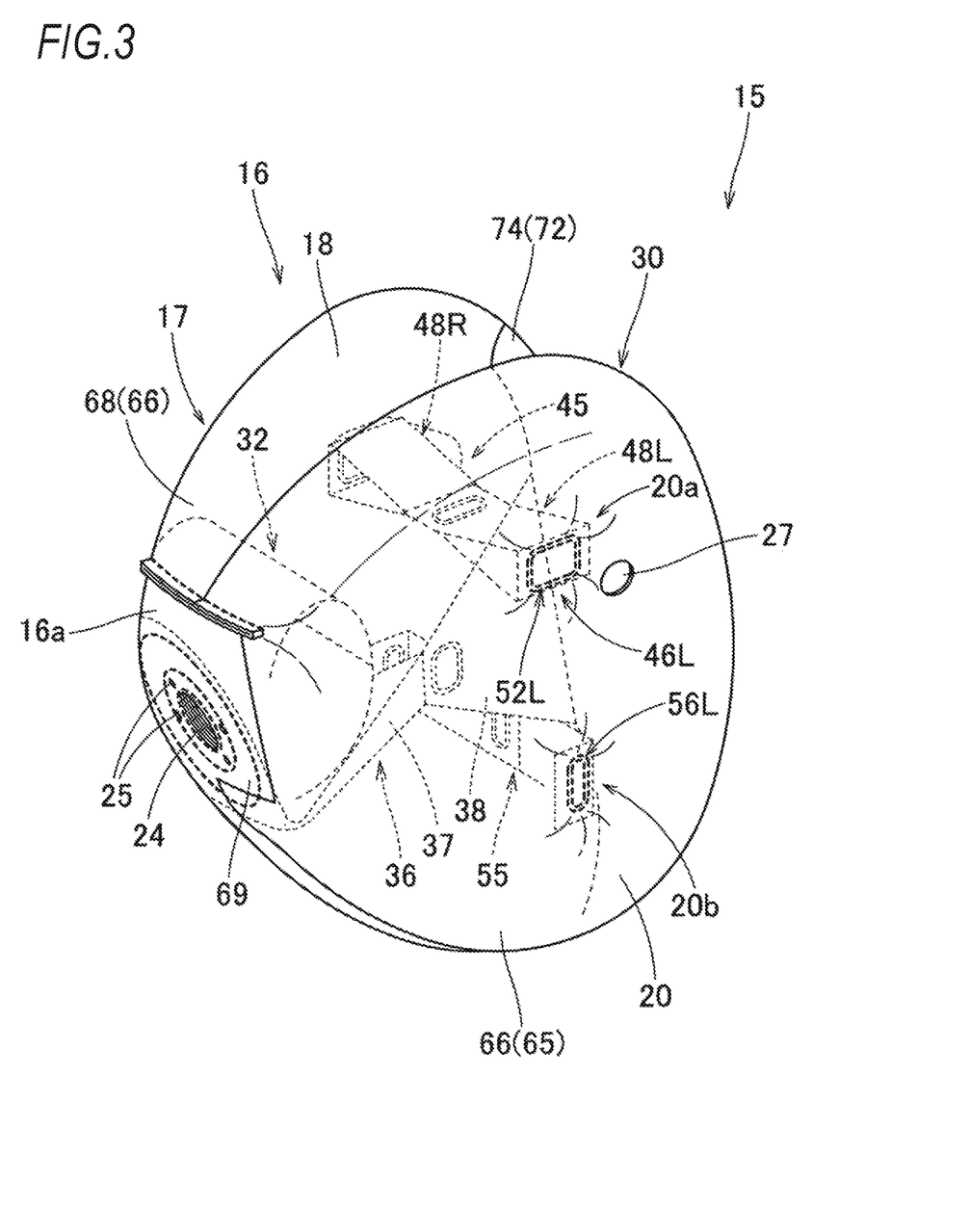
FIG. 3 is a schematic perspective view illustrating a state where the airbag of the embodiment is inflated by itself.
Figure 4:
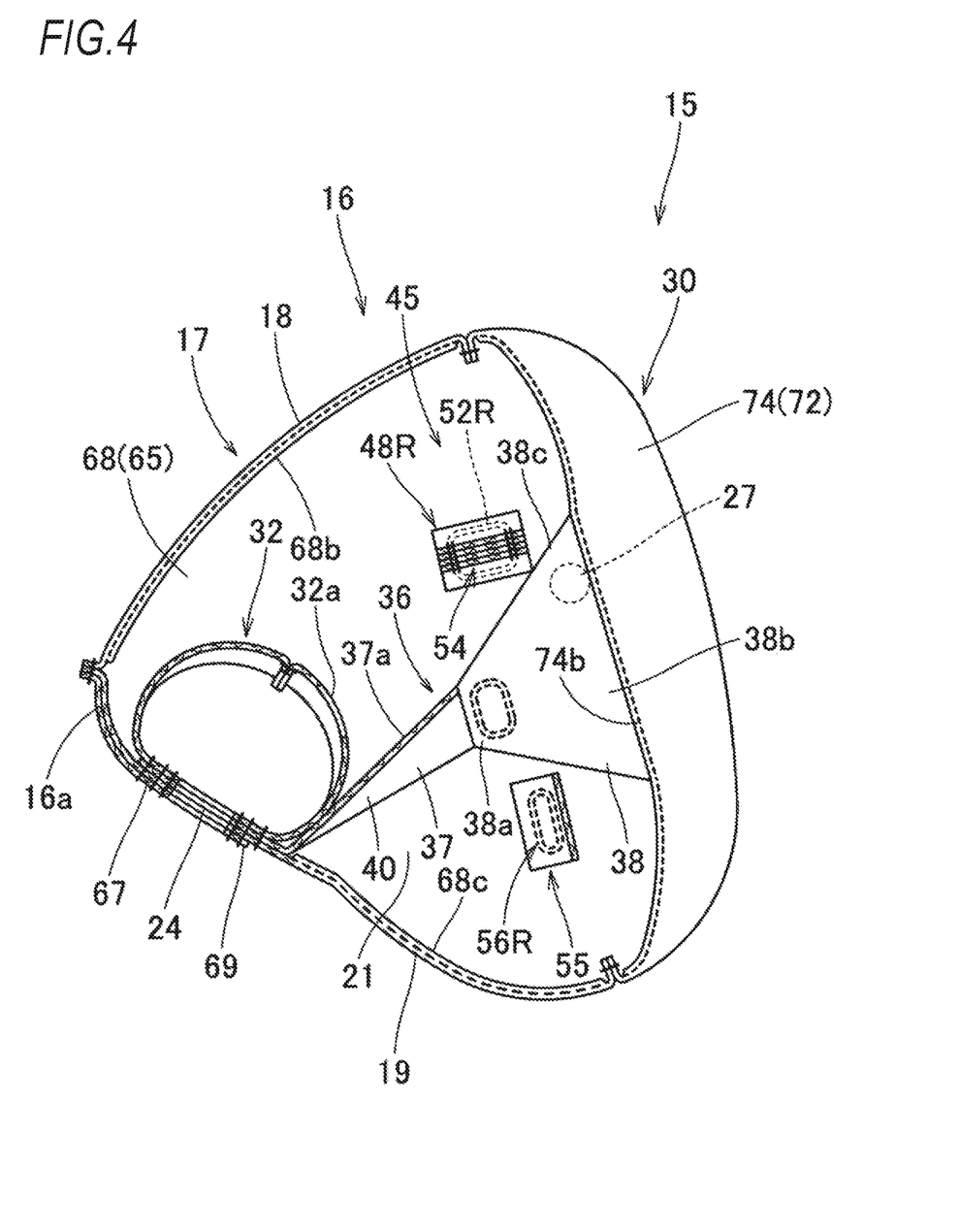
FIG. 4 is a schematic vertical cross-sectional view of the airbag of FIG. 3 taken along a vehicle front-rear direction.
Figure 5:
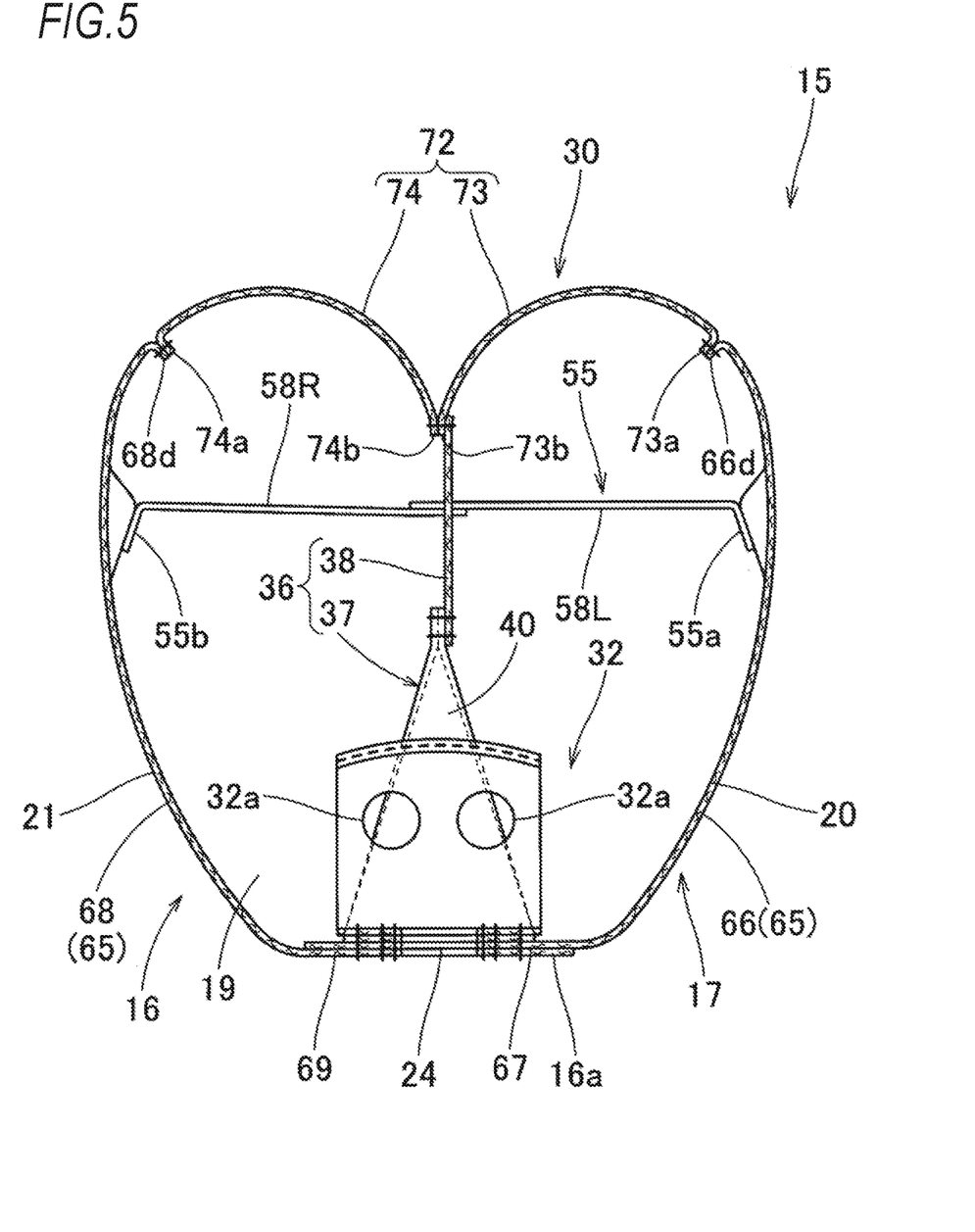
FIG. 5 is a schematic lateral cross-sectional view of the airbag of FIG. 3 along the vehicle front-rear direction.

As illustrated by the chain double-dashed line in FIG. 2 and FIG. 10, the bag main body 16 can be arranged to close a space between the upper surface 2 of the instrument panel 1 and a windshield 4 above the instrument panel 1 when the inflation is completed. Specifically, as illustrated in FIGS. 3 to 5, the bag main body 16 has a substantially quadrangular pyramid shape with an apex located on a front end side when the inflation is completed. The bag main body 16 includes an occupant side wall portion 30 which is arranged on the occupant side to receive the occupant when the inflation is completed and the peripheral wall portion 17 which extends from a peripheral edge of the occupant side wall portion 30 and converges toward the front end side attached to the case 12 side.

The peripheral wall portion 17 is a portion which is arranged to mainly block between the upper surface 2 of the instrument panel 1 and the windshield 4 above the instrument panel 1 when the inflation of the airbag 15 is completed. The peripheral wall portion 17 includes an upper wall portion 18 and a lower wall portion 19 which are arranged on both upper and lower sides along substantially a left-right direction and a left wall portion 20 and a right wall portion 21 which are arranged on both left and right sides along substantially the front-rear direction. In the vicinity of the front end of the lower wall portion 19 in the peripheral wall portion 17, at a position substantially at the center of the left and right, the inflow opening 24 is formed that is opened in a substantially circular shape so that the inflation gas can flow into the inside and has a peripheral edge attached to the bottom wall portion 12a of the case 12. At the periphery of the inflow opening 24, a plurality of (four in the case of the embodiment) attachment holes 25 for inserting the bolt 9a of the retainer 9 and attaching the peripheral edge of the inflow opening 24 to the bottom wall portion 12a of the case 12 are formed. In the left wall portion 20 and the right wall portion 21 of the peripheral wall portion 17, vent holes 27 for exhausting the excess inflation gas that has flowed into the bag main body 16 are formed in a substantially circular shape.

The occupant side wall portion 30 is arranged along a substantially vertical direction on the rear end side of the bag main body 16 to face the occupant seated in the passenger seat when the bag main body 16 is completely inflated. In the embodiment, the occupant side wall portion 30 is formed such that when the bag main body 16 is completely inflated, the left-right center is slightly recessed forward along the vertical direction (see FIGS. 4 and 5).

The rectifying cloth 32 covers the upper side of the inflow opening 24 and has a substantially cylindrical shape with both left and right sides opened, and is configured to allow the inflation gas flowing from the inflow opening 24 into the bag main body 16 to flow to the left and right sides once. The rectifying cloth 32 is formed with an auxiliary opening 32a (see FIGS. 4 and 5). The rectifying cloth 32 is composed of a rectifying cloth material 34 illustrated in FIG. 9.

As the tethers which regulate the inflation completion shape of the bag main body 16, inside the bag main body 16, a front-rear tether 36, a left-right tether 45, and an auxiliary left-right tether 55 are arranged.

The front-rear tether 36 connects substantially the right-left center of the occupant side wall portion 30 and a front end 16a side of the bag main body 16 to extend substantially in the front-rear direction. In the embodiment, the front-rear tether 36 is configured to connect a front side portion 37 extending from the peripheral edge of the inflow opening 24 and a rear side portion 38 extending from the occupant side wall portion 30 side (see FIGS. 4 and 5). In the embodiment, the front side portion 37 is formed by folding a strip-shaped front side portion material 40 illustrated in FIG. 9 and has a left-right symmetrical shape. The front side portion 37 is a three-dimensional shape approximating the outer shape of the bag main body 16 at the time of completion of inflation to a substantially triangular pyramid shape such that the front end side is substantially along the left-right direction and the rear end side is substantially along the up-down direction. The rear side portion 38 is configured to have a substantially trapezoidal shape with the outer shape narrowed toward a front end 38a side connected to the front side portion 37. In the embodiment, the rear side portion 38 has a rear edge 38b sewn to inner edges 73b and 74b of a left side portion 73 and a right side portion 74 of an occupant side panel portion 72 described below and is connected to the substantially upper-lower central position of the occupant side wall portion 30 (see FIGS. 4 and 5). The front-rear tether 36 is provided to prevent excessive rearward protrusion of the airbag 15 during expansion and inflation, and to regulate the separation distance from the front end 16a of the bag main body 16 to the occupant side wall portion 30 when the expansion and inflation of the airbag 15 is completed. In the embodiment, by arranging the front-rear tether 36 inside, when the inflation of the airbag 15 is completed, the occupant side wall portion 30 is configured such that the substantially left-right central portion is slightly recessed forward along the up-down direction.

The left-right tether 45 is arranged in the bag main body 16 substantially along the left-right direction to connect the left wall portion 20 and the right wall portion 21 which face each other on the left-right direction side of the peripheral wall portion 17. In the embodiment, the left-right tether 45 is configured to prevent lateral outward protrusion of connecting portions 46L and 46R with the left wall portion 20 and the right wall portion 21. In the embodiment, the left-right tether 45 is configured by arranging a pair of left and right tether main bodies 48L and 48R described below on the left wall portion 20 side and the right wall portion 21 side.

Figure 6:
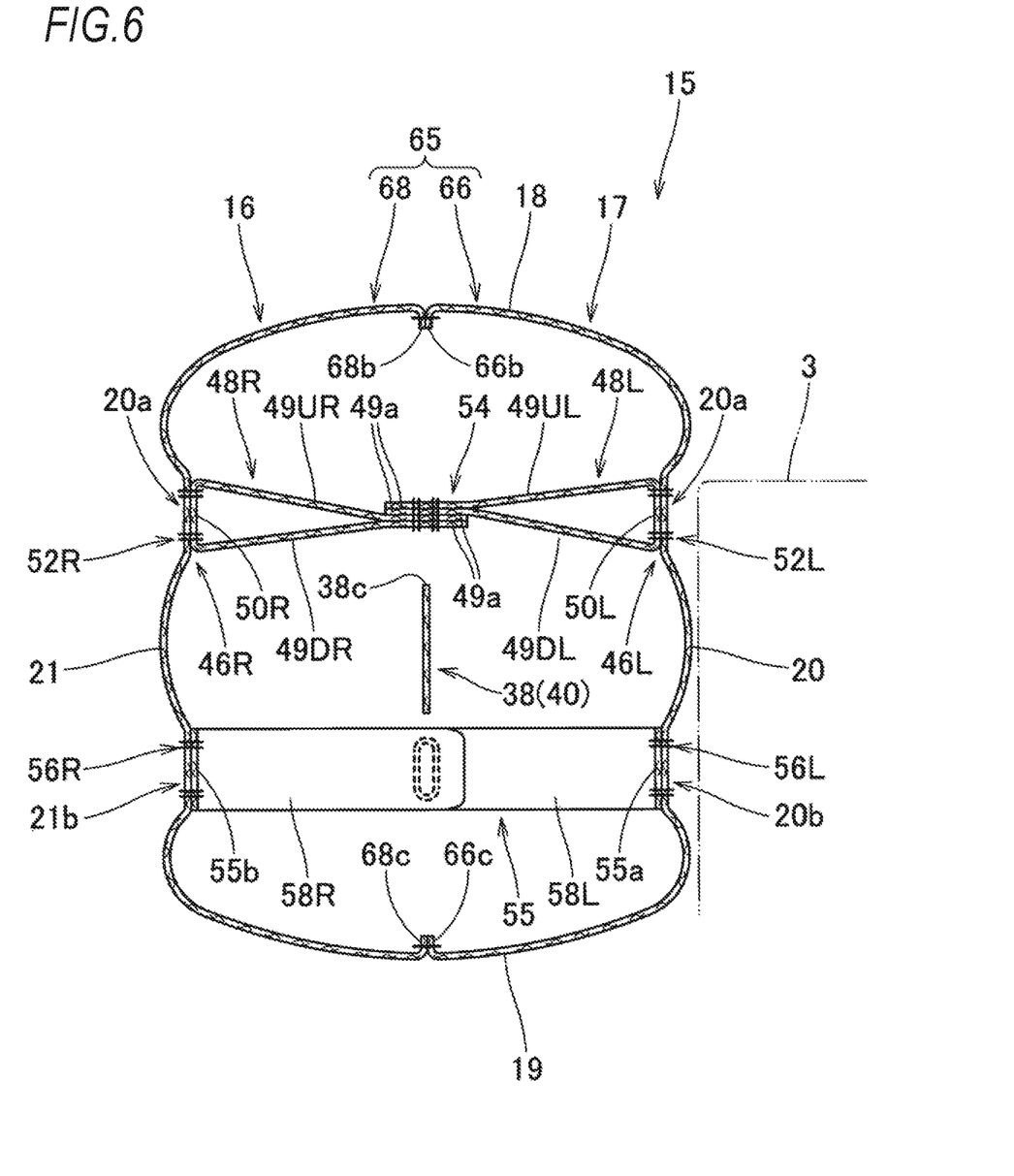
FIG. 6 is a schematic vertical cross-sectional view of the airbag of FIG. 3 along a vehicle left-right direction.
Figure 7:
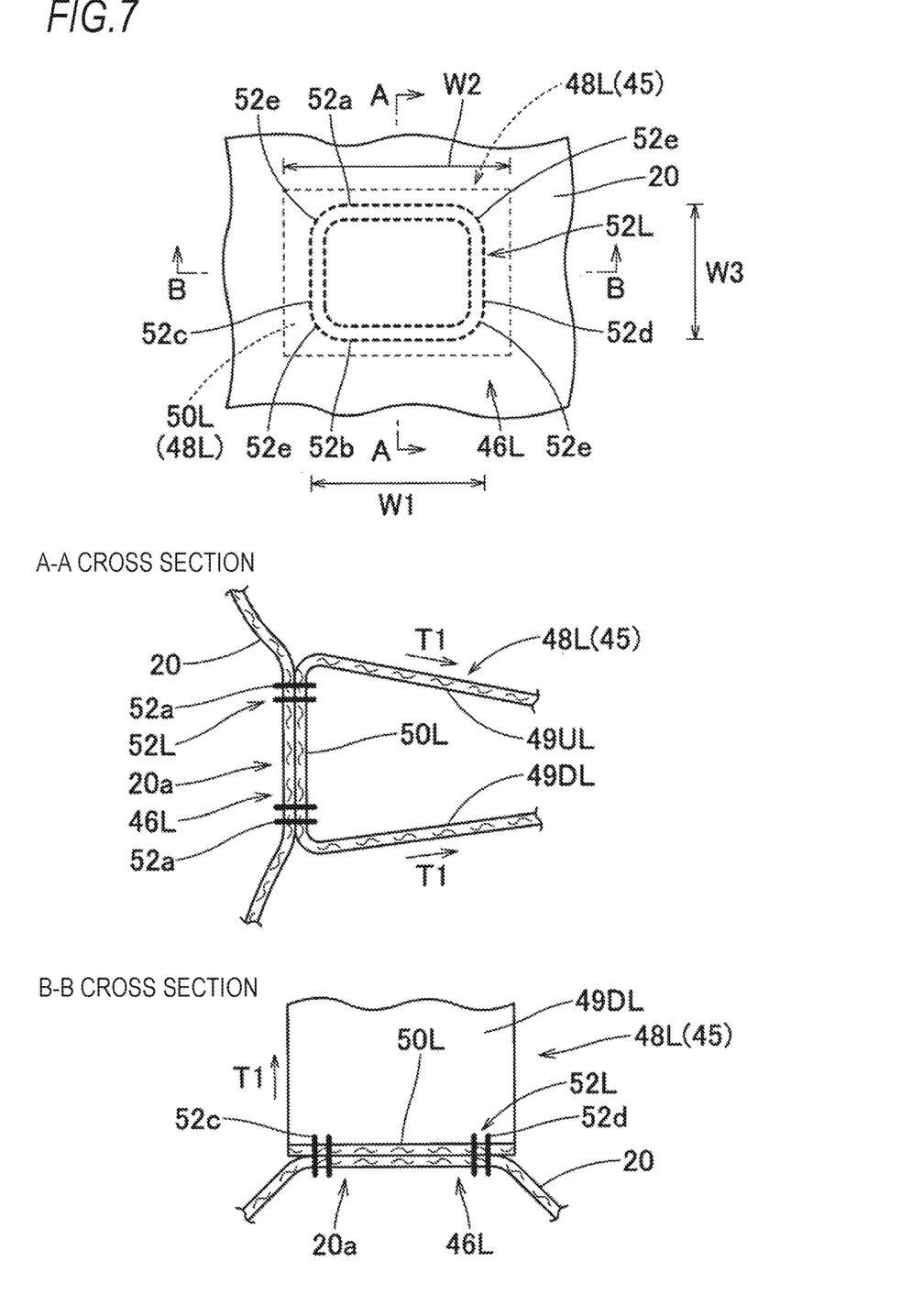
FIG. 7 is a partially enlarged plan view and a cross-sectional view illustrating an arrangement region of a left-right tether in the airbag of FIG. 3.

Specifically, in the embodiment, as illustrated in FIG. 6, the left-right tether 45 is configured by sewing a pair of left and right tether main bodies 48L and 48R arranged on the left wall portion 20 side and the right wall portion 21 side to the left wall portion 20 and the right wall portion 21, respectively. Specifically, the connecting portions 46L and 46R for connecting the left-right tether 45 to the left wall portion 20 and the right wall portion 21, respectively, are composed of the tether main bodies 48L and 48R which are strip-shaped flexible sheet bodies and respective tether main bodies 48L and 48R are configured to include pairs of strip portions 49UL, 49DL, 49UR, and 49DR and intermediate portions 50L and 50R which are sewn and connected to the left wall portion 20 and the right wall portion 21 between the strip portions 49UL, 49DL, 49UR, and 49DR. In the embodiment, the tether main bodies 48L and 48R are configured such that the intermediate portions 50L and 50R are sewn to the left wall portion 20 and the right wall portion 21 such that the width direction is substantially along the front-rear direction side. That is, in the embodiment, respective strip portions 49UL, 49DL, 49UR, and 49DR are configured to extend from the upper edge side and the lower edge side of the intermediate portions 50L and 50R as illustrated in FIGS. 6 and 7. The left-right tether 45 is configured to connect the left wall portion 20 and the right wall portion 21 by connecting terminals 49a of the strip portion 49UL, 49DL, 49UR, and 49DR, which are the tips of respective connecting portions 46L and 46R, to each other by sewing four sheets at once.

Sewn portions 52L and 52R which connect the intermediate portions 50L and 50R to the left wall portion 20 and the right wall portion 21 are formed in a rectangular shape with opposing sides substantially parallel to each other. In the embodiment, in detail, the sewn portions 52L and 52R are configured such that the four corners (corners 52e) of the rectangular shape are substantially arcuate. That is, each of the corners 52e is formed into a substantially ¼ circular arc shape (about R10). In the embodiment, as illustrated in detail in FIG. 7, the sewn portions 52L and 52R are configured to have a width dimension in the front-rear direction side larger than a width dimension in the up-down direction side and are configured in a substantially rectangular shape in which the front-rear direction side that is the width-direction side of the tether main bodies 48L and 48R is wide. Specifically, in the sewn portion 52L and 52R, a width dimension W1 on the front-rear direction side is set to about ⅞ of a width dimension W2 of the tether main bodies 48L and 48R and a width dimension W3 in the up-down direction is set to about ⅝ of the width dimension W1 in the front-rear direction (see FIG. 7). In the embodiment, the radius of the corner 52e is set to about ⅛ of the width dimension W1. In the embodiment, in each of the sewn portions 52L and 52R, an upper side 52a and a lower side 52b facing each other in the up-down direction side form pairs of strip-side sides on the strip portions 49DL, 49DL, 49UR, and 49DR sides and a front side 52c and a rear side 52d which face each other in the front-rear direction side form a pair of non-strip-side sides which connect both ends of the strip-side sides (upper side 52a, lower side 52b) to each other.

The left-right tether 45 is arranged above the front-rear tether 36 in the bag main body 16 when the inflation is completed. When the arrangement position is described in detail, the left-right tether 45 is disposed at a position slightly rearward of the front-rear center and above the upper-lower center in a state where the airbag 15 is viewed from the left-right direction side when the inflation is completed. As illustrated in FIG. 10, the left-right tether 45 is arranged at a position corresponding to the monitor 3 partially protruding from the upper surface 2 in the center side portion 1a of the instrument panel 1. The left-right tether 45 is arranged so that the width directions of the strip portions 49UL, 49DL, 49UR, and 49DR are substantially aligned with the front-rear direction. In the embodiment, the tether main bodies 48L and 48R are arranged such that the strip portions 49DL and 49DR on the side closer to the front-rear tether 36 are made to approach the vertical edges (in the embodiment, an upper surface 37a of the front side portion 37 and an upper edge 38c of the rear side portion 38 in the front-rear tether 36) on the side closer to the left-right tether 45 on the front-rear tether 36 (see FIGS. 4 and 6). Specifically, in the left-right tether 45, a portion of a terminal connecting portion 54 in which terminals 49a of the strip portions 49UL, 49DL, 49UR, and 49DR are sewn together at once by stacking four sheets is arranged close to the upper surface 37a of the front side portion 37 and the upper edge 38c of the rear side portion 38 in the front-rear tether 36 (see FIGS. 4 and 6). The left-right tether 45 is arranged to prevent the excessive separation between the left wall portion 20 and the right wall portion 21 when the airbag 15 is expanded and inflated and to regulate the separation distance between the left wall portion 20 and the right wall portion 21 when the inflation of the airbag 15 is completed. The actual length of the left-right tether 45 is set to a length in which, when the inflation of the airbag 15 is completed, in each of the left wall portion 20 and the right wall portion 21, the recesses 20a and 21a are formed to face inward on the left and right in the connecting portions 46L and 46R with the left-right tether 45, and thus the interference with the monitor 3 arranged close to the left side of the left wall portion 20 can be prevented (see FIG. 6).

Figure 8:
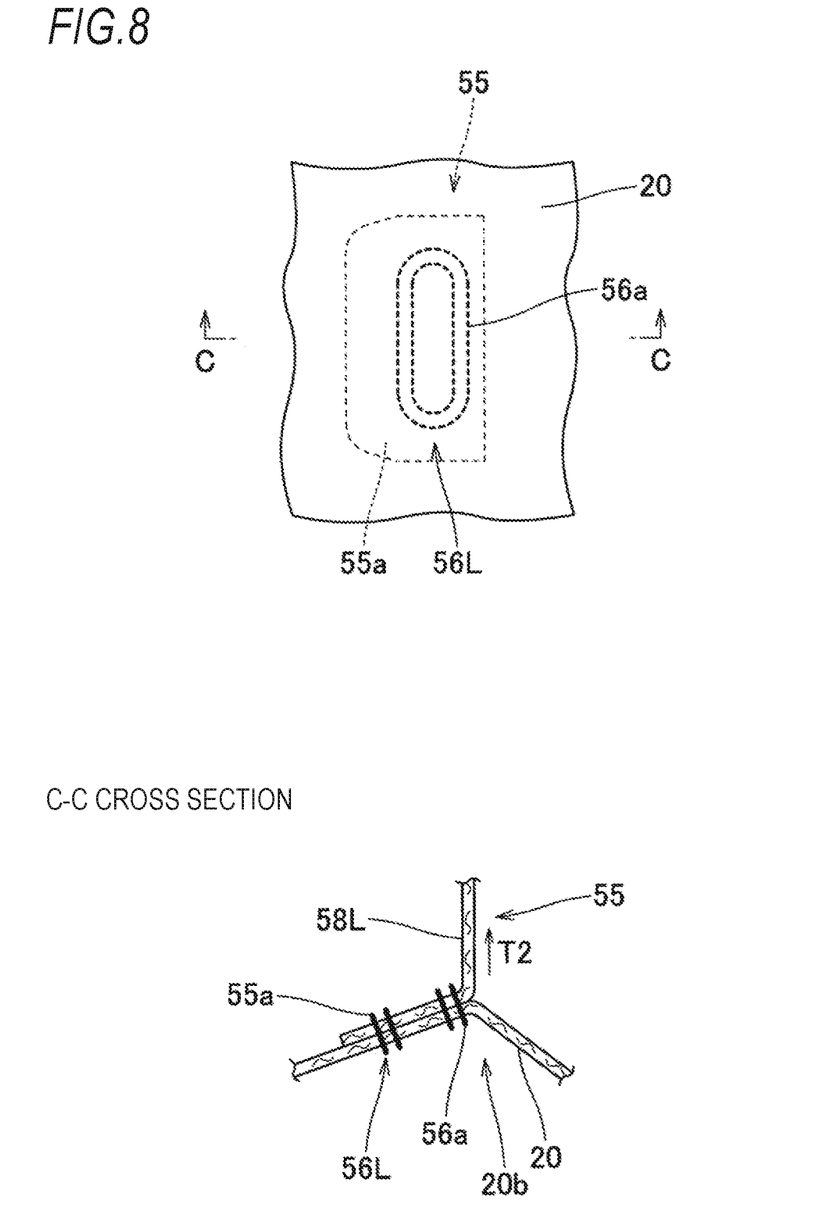
FIG. 8 is a partially enlarged plan view and a cross-sectional view illustrating an arrangement region of an auxiliary left-right tether in the airbag of FIG. 3.

The auxiliary left-right tether 55 is arranged substantially along the left-right direction inside the bag main body 16 to connect the left wall portion 20 and the right wall portion 21 at a position below the front-rear tether 36. More specifically, the auxiliary left-right tether 55 is arranged at a position substantially directly below the left-right tether 45 with the front-rear tether 36 interposed therebetween when the inflation of the airbag 15 is completed. The auxiliary left-right tether 55 is composed of two strip-shaped tether base materials 58L and 58R and is arranged so that the width direction is substantially along the up-down direction (make the width direction substantially orthogonal to the width direction of the strip portions 49UL, 49DL, 49UR, and 49DR in the left-right tether 45). The width dimensions of the tether base materials 58L and 58R forming the auxiliary left-right tether 55 are set to be substantially the same as the width dimensions of the tether main bodies 48L and 48R forming the left-right tether 45 (see FIG. 9). The auxiliary left-right tether 55 is configured such that end portions 55a and 55b are respectively sewn to the left wall portion 20 and the right wall portion 21 by the elliptical sewn portions 56L and 56R whose major axes extend substantially in the up-down direction (see FIGS. 4 and 8). The sewn portions 56L and 56R to which the end portions 55a and 55b of the auxiliary left-right tether 55 are sewn are made narrower than the sewn portions 52L and 52R in which the intermediate portions 50L and 50R of the left-right tether 45 are sewn to the left wall portion 20 and the right wall portion 21. The auxiliary left-right tether 55 is also arranged to prevent the excessive separation between the left wall portion 20 and the right wall portion 21 when the airbag 15 is expanded and inflated and to regulate the separation distance between the left wall portion 20 and the right wall portion 21 when the inflation of the airbag 15 is completed. In the embodiment, the length dimension of the auxiliary left-right tether 55 is set to be substantially the same as the substantial length dimension of the left-right tether 45. That is, even in the arrangement area of the auxiliary left-right tether 55, in the left wall portion 20 and the right wall portion 21, the recesses 20b and 21b are formed inwardly on the left and right, similarly to the arrangement area of the left-right tether 45 (see FIG. 6).

Figure 9:
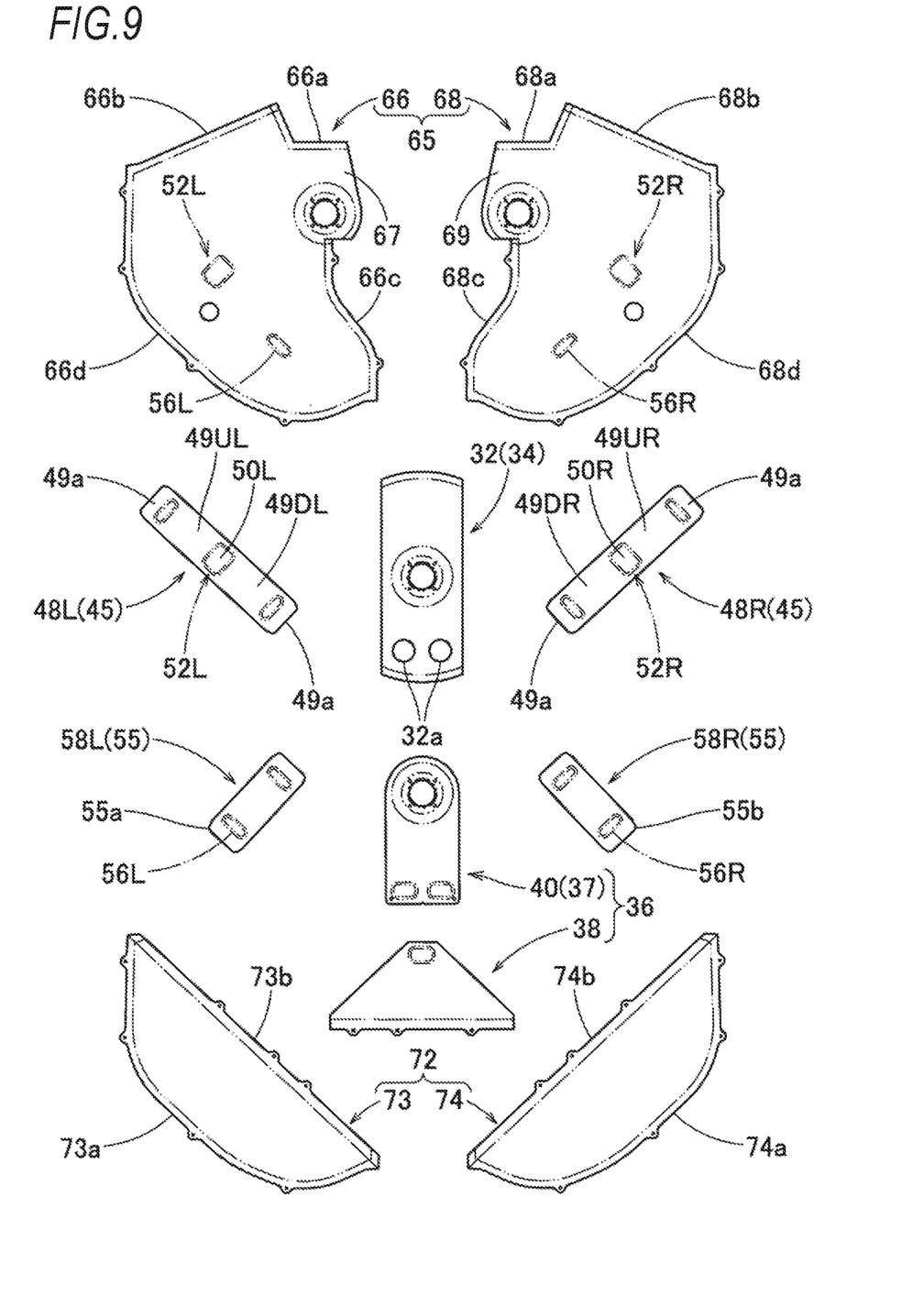
FIG. 9 is a plan view illustrating base fabrics which form the airbag of FIG. 3.

The bag main body 16 is formed by joining the peripheral edges of base fabrics of a predetermined shape to each other in a bag shape. In the embodiment, as illustrated in FIG. 9, the bag main body 16 includes a peripheral wall panel portion 65 which mainly forms the peripheral wall portion 17 side and the occupant side panel portion 72 which mainly foil is the occupant side wall portion 30 side. The peripheral wall panel portion 65 is provided with a left side panel 66 which forms a left side region and a right side panel 68 which forms a right side region so that the peripheral wall portion 17 is roughly divided into two in the left-right direction. The left side panel 66 is configured to extend from the left half region of the upper wall portion 18 in the peripheral wall portion 17 to the left half region of the lower wall portion 19 through the left wall portion 20 and the right side panel 68 extends from the right half region of the upper wall portion 18 of the peripheral wall portion 17 to the right half region of the lower wall portion 19 through the right wall portion 21. The left side panel 66 and the right side panel 68 are respectively provided with protrusions 67 and 69 which form the peripheral edge region of the inflow opening 24. The occupant side panel portion 72 mainly includes the left side portion 73 which forms a left side region and the right side portion 74 which forms a right side region to mainly divide the occupant side wall portion 30 into two substantially in the left-right direction.

In the embodiment, the peripheral wall panel portion 65 (left side panel 66, right side panel 68) and the occupant side panel portion 72 (left side panel 66, right side panel 68) which form the bag main body 16, the rectifying cloth material 34 which form the rectifying cloth 32, the front side portion material 40 and the rear side portion 38 which form the front-rear tether 36, the tether main bodies 48L and 48R which form the left-right tether 45, and the tether base materials 58L and 58R which form the auxiliary left-right tether 55 are formed of a flexible woven fabric made of polyester yarn, polyimide yarn, or the like.

Next, manufacturing of the airbag 15 of the embodiment will be described. The left side portion 73 and the right side portion 74 of the occupant side panel portion 72 are sewn together with the inner edges 73b and 74b in advance. Here, the rear edge 38b of the rear side portion 38 of the front-rear tether 36 is also sewn together. On the inner peripheral surface side of the left side panel 66 and the right side panel 68, in advance, the intermediate portions 50L and 50R in the tether main bodies 48L and 48R forming the left-right tether 45 are sewn together to form the sewn portions 52L and 52R. Similarly, the end portions of the tether base materials 58L and 58R forming the auxiliary left-right tether 55 are sewn to form the sewn portions 56L and 56R. Then, first, the left side panel 66 and the right side panel 68 are overlapped and lower edges 66c and 68c are sewn together. Next, the left side panel 66 and the right side panel 68 are opened to separate upper edges 66b and 68b from each other and the protrusions 67 and 69 are overlapped with each other, and then the front side portion material 40 of the front-rear tether 36 and the rectifying cloth material 34 are overlapped on the inner peripheral surface side of the protrusions 67 and 69. Then, the peripheral portion of the inflow opening 24 is sewn by using a suture and the protrusions 67 and 69 are sewn together with the front side portion material 40 and the rectifying cloth material 34. Next, the inflow opening 24 and the attachment hole 25 are opened. After that, the upper edges 66b and 68b of the left side panel 66 and the right side panel 68 are sewn together by using a suture thread. Then, the rear edge 66d of the left side panel 66 and an outer edge 73a of the left side portion 73 of the occupant side panel portion 72 are sewn together, and similarly, the rear edge 68d of the right side panel 68 and an outer edge 74a of the right side portion 74 are sewn together. The terminal portions 49a of the strip portions 49UL, 49DL, 49UR, and 49DR are sewn at once by stacking four sheets to form the terminal connecting portion 54 to form the left-right tether 45 and the end portions of the tether base materials 58L and 58R are sewn together to form the auxiliary left-right tether 55. A rear end 40a of the front side portion material 40 and the front end 38a of the rear side portion 38 are sewn together to form a front-rear tether 36. The corresponding edges of the rectifying cloth material 34 are sewn together to form the rectifying cloth 32. Thereafter, the bag main body 16 is inverted using the regions of front upper edges 66a and 68a in the left side panel 66 and the right side panel 68 which are not sewn. After that, when the front upper edge 66a of the left side panel 66 and the front upper edge 68a of the right side panel 68 are folded in two and sewn using a suture, at the same time that the bag main body 16 can be manufactured, the airbag 15 can be manufactured.

Next, the mounting of the airbag device M on the vehicle will be described. First, the airbag 15 is folded to be accommodated in the case 12 with the retainer 9 accommodated inside and the periphery of the folded airbag 15 is wrapped with a rupturable wrapping sheet (not illustrated) not to collapse. Then, the folded airbag 15 is accommodated in the case 12 such that the bolt 9a is projected from the bottom wall portion 12a. Then, by inserting the main body portion 8a of the inflator 8 into the case 12 from below the bottom wall portion 12a and by inserting the bolt 9a of the retainer 9 protruding downward from the bottom wall portion 12a into the flange portion 8c of the inflator 8 and fastening the nut 10 to each bolt 9a protruding from the flange portion 8c, the folded airbag 15 and the inflator 8 can be attached to the case 12.

After that, the peripheral wall portion 12b of the case 12 is locked to the connecting wall portion 6c of the airbag cover 6 in the instrument panel 1 mounted on the vehicle V and the bracket (not illustrated) provided in case 12 is fixed to the body side of the vehicle V, and then the inflator 8 is electrically connected to a control device (not illustrated), in such a manner that the airbag device M can be mounted on the vehicle V.

When the inflation gas is discharged from the gas discharge port 8b of the inflator 8 after mounting the airbag device M on the vehicle V, the airbag 15 inflates by making the inflation gas flow therein and pushes the door portions 6a and 6b of the airbag cover 6 open. Then, the airbag 15 protrudes upward from the case 12 through an opening formed by pushing open the door portions 6a and 6b of the airbag cover 6 and expands and inflates while protruding toward the vehicle rear side. Next, as illustrated by the chain double-dashed lines in FIGS. 1 and 2, and in FIG. 10, the inflation of the airbag 15 is completed to close the space between the upper surface 2 of the instrument panel 1 and the windshield 4 above the instrument panel 1.

In the airbag 15 of the embodiment, in the left-right tether 45, the connecting portions 46L and 46R connected to the left wall portion 20 and the right wall portion 21 are configured such that the intermediate portions 50L and 50R composed of the tether main bodies 48L and 48R are sewn to the left wall portion 20 and the right wall portion 21 by the substantially rectangular sewn portions 52L and 52R and a pair of strip portions 49UL, 49DL, 49UR, and 49DR extends from opposite sides of the sewn portions 52L and 52R. Therefore, in the airbag 15 of the embodiment, when the inflation of the bag main body 16 is completed, as illustrated in detail in FIG. 7, a tension T1 acting on the respective strip portions 49UL and 49DL (49UR, 49DR) acts to pull respective strip-side sides (upper side 52a, lower side 52b) in the sewn portion 52L (52R) inward in the left-right direction. Since the sewn portion 52L (52R) has a substantially rectangular shape, the tension T1 of the tether main body 48L (48R) can be applied not only to the sides on both strip-side sides (upper side 52a, lower side 52b) of the tether main body 48L (48R) but also to the sides on both non-strip-side sides (front side 52c, rear side 52d). Therefore, the entire arrangement area (entire rectangular area) of the sewn portion 52L (52R) in the left wall portion 20 (right wall portion 21) is pulled to be pulled inward to the left and right. In the embodiment, since the sewn portions 52L and 52R are configured such that the four corners (corners 52e) of the substantially rectangular shape are substantially arc-shaped, stress concentration is less likely to occur. Therefore, the tension T1 acting on the respective strip portions 49UL, 49DL, 49UR, and 49DR can be applied to the peripheral edges (not only the strip-side sides 52a and 52b, but the entire non-strip-side sides 52c and 52d apart from the strip-side sides 52a and 52b in the non-strip-side sides 52c and 52d) of the sewn portions 52L and 52R more smoothly. Therefore, in the airbag 15 of the embodiment, by the left-right tether 45, the left and right protrusions of the left wall portion 20 and the right wall portion 21 to the outside can be stably regulated in a wide area, so the interference with the monitor 3 or the like, which is arranged close to the left side of the left wall portion 20 and partially protrudes from the instrument panel 1, can be stably prevented.

Therefore, in the airbag 15 of the embodiment, the predetermined portion can be stably recessed in a wide area when the inflation is completed.

In the airbag 15 of the embodiment, the tether main bodies 48L and 48R are arranged on the left wall portion 20 side and the right wall portion 21 side and the left-right tether 45 is configured by connecting the terminals 49a of a pair of strip portions 49UL, 49DL, 49UR, and 49DR extending from the respective connecting portions 46L and 46R. Therefore, both the left wall portion 20 side and the right wall portion 21 side of the airbag 15 can stably regulate the outward protrusions on the left and right in a wide area, and thus it can be shared to prevent interference with monitors or the like for right-hand drive vehicles and left-hand drive vehicles. In the embodiment, the left-right tether 45 is formed by sewing the terminals 49a of the strip portions 49UL, 49DL, 49UR, and 49DR at once by stacking four sheets to form the terminal connecting portion 54. However, the tether may be configured by sewing the upper strip portion terminals and the lower strip portion terminals separately to each other. When such points are not considered, as the left-right tether, a structure in which the connecting portion is arranged on one side of the left wall portion side or the right wall portion side and a simple strip-shaped tether base material (the same configuration as the auxiliary left-right tether 55) is arranged on the other side may be used.

In the airbag 15 of the embodiment, in the bag main body 16, the front-rear tether 36 which connects the front end 16a side when inflation is completed and the occupant side wall portion 30 is arranged below the left-right tether 45. However, when the inflation of the bag main body 16 is completed, the tether main bodies 48L and 48R are arranged such that the width direction of the strip portions 49DL and 49DR on the side closer to the front-rear tether 36 is arranged substantially along the front-rear direction to approach the vertical edge (vertical edge of the front-rear tether 36 closer to the left-right tether 45) (in the embodiment, the upper surface 37a of the front side portion 37 and the upper edge 38c of the rear side portion 38) of the front-rear tether on the side closer to left-right tether. Therefore, in the airbag 15 of the embodiment, even when the left-right tether 45 comes into contact with the front-rear tether 36 during the expansion and inflation, since the tether main bodies 48L and 48R of the left-right tether 45 are brought into contact with the front-rear tether 36 on the wide surfaces in the width direction of the strip portions 49DL and 49DR on the approaching side, with less catching, it can be smoothly slid with respect to the front-rear tether 36, and thus the bag main body 16 can be quickly and completely inflated. Specifically, in the embodiment, in the left-right tether 45, the portion of the terminal connecting portion 54 where the terminals 49a of the strip portions 49DL, 49DL, 49DR and 49DR are sewn together at once by stacking four sheets will be arranged close to the front-rear tether 36. Since the upper edge 38c of the rear side portion 38 of the front-rear tether 36 is arranged to be inclined with respect to the front-rear direction, it is arranged to be inclined with respect to the terminal connecting portion 54. However, it is possible to prevent the catch on the front-rear tether as compared with the case where the left-right tether is arranged in a state where the terminal connecting portion is rotated by 90°. When such points are not considered, the tether main body (strip portion) of the left-right tether may be arranged substantially along the up-down direction such that the width direction is substantially orthogonal to the upper edge of the front-rear tether.

In the airbag 15 of the embodiment, since the auxiliary left-right tether 55 is arranged below the front-rear tether 36, the separation distance of the left wall portion 20 and the right wall portion 21 is regulated in a wide range in the up-down direction. In the left wall portion 20 and the right wall portion 21, the recesses 20b and 21b which are directed inward in the left and right due to the auxiliary left-right tether 55 are also generated in a portion on the lower end side. Therefore, interference with the monitor 3 can be prevented even in such region. The auxiliary left-right tether 55 is simply configured to sew the end portions 55a and 55b to the left wall portion 20 and the right wall portion 21 by the sewn portions 56L and 56R. Therefore, when a tension T2 acts on the auxiliary left-right tether 55, in the sewn portion 56L (56R), the portion of the tether base material 58L side on the rear edge 56b side is largely recessed, but the entire arrangement area of the sewn portion 56L (56R) is not stably recessed (see FIG. 8).

In the airbag 15 of the embodiment, the sewn portions 52L and 52R for sewing the tether main bodies 48L and 48R to the left wall portion 20 and the right wall portion 21 are formed into a rectangular shape in which the strip-side sides (upper side 52a, lower side 52b) and the non-strip-side sides (front side 52c, rear side 52d) are substantially parallel to each other. However, when the tension acting on the strip-side side can be stably applied to the entire sewn portion, the strip-side sides or the non-strip-side sides may have a shape which is approximate to a trapezoid that is not parallel. In the embodiment, the tether main bodies 48L and 48R are formed in a strip shape with a constant width dimension. However, as the tether main body, a strip portion configured to increase or decrease the width dimension from the connecting portion to the terminal may be used.

What is claimed is:

1. A passenger seat airbag, which is folded and accommodated in an accommodation portion provided in an instrument panel located in front of an occupant seated in a passenger seat, makes inflation gas flow inside, and expands and inflates toward a rear side of a vehicle while inflating, the passenger seat airbag comprising:
    a bag main body composed of a flexible sheet body, the bag main body including:
        an occupant side wall portion arranged on an occupant side portion when the inflation is completed; and
        a peripheral wall portion extending from a peripheral edge of the occupant side wall portion and converging toward a front end side attached to an accommodation portion side; and
    a left-right tether, arranged in the bag main body to connect a left wall portion and a right wall portion facing each other on a left-right direction side of the peripheral wall portion, the left-right tether preventing left and right outward protrusions of a connecting portion with the left wall portion or the right wall portion, wherein:
    the connecting portion of the left-right tether is composed of a tether main body of a strip-shaped sheet body having a flexibility and includes a pair of strip portions and an intermediate portion which is sewn and connected to the left wall portion or the right wall portion at an area between the strip portions;
    the left-right tether is formed of terminals of the strip portions sewn together at once as four sheets stacked together; and
    a sewn portion for sewing the intermediate portion to the left wall portion or the right wall portion is configured as a substantially rectangular shape having a pair of strip-side sides on a strip portion side and a pair of non-strip-side sides connecting both ends of the pair of strip-side sides.

2. The passenger seat airbag according to claim 1, wherein:
    the tether main body is arranged on a left wall portion side and a right wall portion side; and
    the left-right tether is configured by connecting terminals of the pair of strip portions extending from each of the connecting portions.

3. The passenger seat airbag according to claim 2, wherein:
   in the bag main body, a front-rear tether which connects a front end side at the time of completion of inflation and the occupant side wall portion substantially along a front-rear direction is arranged above or below the left-right tether; and
   the tether main body is arranged such that, when the inflation of the bag main body is completed, one of the strip portions on a side of the tether main body which is closer to the front-rear tether is aligned with a width direction substantially along the front-rear direction so as to approach an edge of the front-rear tether on an up-down direction side on a side of the front-rear tether which is closer to the left-right tether.

* * * * *